(12) United States Patent
Domschke

(10) Patent No.: US 8,899,745 B2
(45) Date of Patent: Dec. 2, 2014

(54) OPHTHALMIC LENSES MODIFIED WITH FUNCTIONAL GROUPS AND METHODS OF MAKING THEREOF

(75) Inventor: Angelika Maria Domschke, Duluth, GA (US)

(73) Assignee: Novartis AG, Basel (CH)

( * ) Notice: Subject to any disclaimer, the term of this patent is extended or adjusted under 35 U.S.C. 154(b) by 414 days.

(21) Appl. No.: 13/324,238

(22) Filed: Dec. 13, 2011

(65) Prior Publication Data

US 2012/0147323 A1    Jun. 14, 2012

Related U.S. Application Data

(60) Provisional application No. 61/422,382, filed on Dec. 13, 2010.

(51) Int. Cl.
| | | |
|---|---|---|
| *G02C 3/00* | (2006.01) | |
| *G02C 7/02* | (2006.01) | |
| *G02C 7/10* | (2006.01) | |
| *B29D 11/00* | (2006.01) | |
| *G02B 3/00* | (2006.01) | |
| *B29D 17/00* | (2006.01) | |
| *G02B 1/04* | (2006.01) | |

(52) U.S. Cl.
CPC .......... *G02B 1/043* (2013.01); *B29D 11/00865* (2013.01); *B29D 11/00038* (2013.01)
USPC ..................................... 351/159.62; 264/1.32

(58) Field of Classification Search
USPC ............. 351/159.01, 159.62, 159.73, 159.74, 351/159.75, 159.76; 264/1.1, 1.32
See application file for complete search history.

(56) References Cited

U.S. PATENT DOCUMENTS

| | | | |
|---|---|---|---|
| 3,159,646 | A | 12/1964 | Milionis |
| 3,408,429 | A | 10/1968 | Otto |
| 3,761,272 | A | 9/1973 | Mannens |
| 4,136,250 | A | 1/1979 | Mueller |
| 4,153,641 | A | 5/1979 | Deichert |
| 4,182,822 | A | 1/1980 | Chang |
| 4,189,546 | A | 2/1980 | Deichert |
| 4,254,248 | A | 3/1981 | Friends |

(Continued)

FOREIGN PATENT DOCUMENTS

| | | |
|---|---|---|
| EP | 0958315 B1 | 2/1998 |
| EP | 0961941 B1 | 2/1998 |

(Continued)

OTHER PUBLICATIONS

PCT International Search Report dated Mar. 1, 2012, International Application No. PCT/US2011/064568, International Filing Date Dec. 13, 2011.

(Continued)

*Primary Examiner* — James Greece
(74) *Attorney, Agent, or Firm* — Sheng-Hsin Hu

(57) ABSTRACT

Described are methods for covalently attaching one or more functional compounds to an ophthalmic lens. The method involves (a) contacting the lens with a functional compound, wherein the functional compound comprises at least one group capable of forming a covalent bond with the lens upon exposing the lens to irradiation and/or heat; and (b) irradiating and/or heating the lens produced in step (a) to covalently attach the functional compound to the lens. Also described herein are ophthalmic lens produced by the methods described herein.

15 Claims, 9 Drawing Sheets

(56) References Cited

U.S. PATENT DOCUMENTS

| | | |
|---|---|---|
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,304,895 A | 12/1981 | Loshaek |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,444,711 A | 4/1984 | Schad |
| 4,460,534 A | 7/1984 | Boehm |
| 4,486,577 A | 12/1984 | Mueller |
| 4,528,311 A | 7/1985 | Beard |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,716,234 A | 12/1987 | Dunks |
| 4,719,248 A | 1/1988 | Bambury |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson |
| 5,079,319 A | 1/1992 | Mueller |
| 5,164,462 A | 11/1992 | Yang |
| 5,224,957 A | 7/1993 | Gasser |
| 5,298,033 A * | 3/1994 | Hung et al. ............ 8/509 |
| 5,346,946 A | 9/1994 | Yokoyama |
| 5,352,753 A | 10/1994 | Yang |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,466,768 A | 11/1995 | Yang |
| 5,486,579 A | 1/1996 | Lai |
| 5,489,474 A | 2/1996 | Shinoda |
| 5,508,317 A | 4/1996 | Müller |
| 5,527,925 A | 6/1996 | Chabrecek |
| 5,554,663 A | 9/1996 | Desobry |
| 5,559,163 A | 9/1996 | Dawson |
| 5,583,163 A | 12/1996 | Müller |
| 5,597,854 A | 1/1997 | Birbaum |
| 5,663,288 A | 9/1997 | Shinoda |
| 5,665,840 A | 9/1997 | Pohlmann |
| 5,712,356 A | 1/1998 | Bothe |
| 5,723,512 A | 3/1998 | Leppard |
| 5,760,100 A | 6/1998 | Nicolson |
| 5,767,169 A | 6/1998 | Leppard |
| 5,789,464 A | 8/1998 | Müller |
| 5,843,346 A | 12/1998 | Morrill |
| 5,849,810 A | 12/1998 | Müller |
| 5,849,841 A | 12/1998 | Mühlebach |
| 5,894,002 A | 4/1999 | Boneberger |
| 5,914,355 A | 6/1999 | Künzler |
| 5,936,052 A | 8/1999 | Bothe |
| 5,945,465 A | 8/1999 | Ozark |
| 5,962,548 A | 10/1999 | Vanderlaan |
| 5,965,776 A | 10/1999 | Leppard |
| 5,981,675 A | 11/1999 | Valint, Jr. |
| 5,989,462 A | 11/1999 | Buazza |
| 6,015,842 A | 1/2000 | LeBoeuf |
| 6,020,528 A | 2/2000 | Leppard |
| 6,039,913 A | 3/2000 | Hirt |
| 6,136,880 A | 10/2000 | Snowhite |
| 6,153,760 A | 11/2000 | Künzler |
| 6,165,408 A | 12/2000 | Steinmann |
| 6,218,463 B1 | 4/2001 | Molock |
| 6,221,303 B1 | 4/2001 | Steinmann |
| 6,244,707 B1 | 6/2001 | Faubl |
| 6,284,813 B1 | 9/2001 | Leppard |
| 6,303,687 B1 | 10/2001 | Müller |
| 6,342,570 B1 | 1/2002 | Bothe |
| 6,359,024 B2 | 3/2002 | Lai |
| 6,359,025 B1 | 3/2002 | Snowhite |
| 6,361,925 B1 | 3/2002 | Leppard |
| 6,465,538 B2 | 10/2002 | Lai |
| 6,472,489 B1 | 10/2002 | Stockinger |
| 6,479,587 B1 | 11/2002 | Stockinger |
| 6,492,478 B1 | 12/2002 | Steinmann |
| 6,623,786 B2 | 9/2003 | Baron |
| 6,627,124 B1 | 9/2003 | Herbrechtsmeier |
| 6,630,083 B1 | 10/2003 | Nunez |
| 6,762,264 B2 | 7/2004 | Künzler |
| 6,776,934 B2 | 8/2004 | Lai |
| 6,914,086 B2 | 7/2005 | Hong |
| 7,091,283 B2 | 8/2006 | Müller |
| 7,119,210 B2 | 10/2006 | Schlueter |
| 7,238,750 B2 | 7/2007 | Müller |
| 7,268,189 B2 | 9/2007 | Müller |
| 7,381,762 B2 | 6/2008 | Xia |
| 7,384,590 B2 | 6/2008 | Kelly |
| 7,387,759 B2 | 6/2008 | Kelly |
| 7,396,942 B2 | 7/2008 | Schlueter |
| 7,521,519 B1 | 4/2009 | Hirt et al. |
| 7,541,407 B2 | 6/2009 | Murdaugh |
| 7,649,058 B2 | 1/2010 | McCabe |
| 8,003,710 B2 | 8/2011 | Medina |
| 2002/0042022 A1 | 4/2002 | Leppard |
| 2003/0125498 A1 | 7/2003 | McCabe |
| 2004/0082680 A1 | 4/2004 | Phelan |
| 2005/0113549 A1 | 5/2005 | Devlin |
| 2005/0237483 A1 | 10/2005 | Phelan |
| 2006/0007391 A1 | 1/2006 | McCabe |
| 2006/0252850 A1 | 11/2006 | Jani |
| 2007/0078196 A1 | 4/2007 | Schlueter |
| 2008/0015315 A1 | 1/2008 | Chang |
| 2008/0143003 A1 | 6/2008 | Phelan |
| 2008/0143958 A1 | 6/2008 | Medina |
| 2008/0221675 A1 | 9/2008 | Schlueter |
| 2008/0231798 A1 | 9/2008 | Zhou |
| 2008/0234457 A1 | 9/2008 | Zhou |
| 2010/0168359 A1* | 7/2010 | Domschke et al. ......... 526/259 |

FOREIGN PATENT DOCUMENTS

| | | |
|---|---|---|
| WO | 9620796 A1 | 7/1996 |
| WO | 9620919 A1 | 7/1996 |
| WO | 9628762 A1 | 9/1996 |
| WO | 0031150 A1 | 6/2000 |

OTHER PUBLICATIONS

PCT Written Opinion of the International Searching Authority dated Mar. 1, 2012, International Application No. PCT/US2011/064568, International Filing Date Dec. 13, 2011.

* cited by examiner

OPHTHALMIC LENSES MODIFIED WITH FUNCTIONAL GROUPS AND METHODS OF MAKING THEREOF

This application claims the benefit under 35 USC §119 (e) of U.S. provisional patent application No. 61/422,382 filed Dec. 13, 2010, herein incorporated by reference in its entirety.

BACKGROUND

One approach for implementing UV absorbing or wetting properties to a contact lens is to incorporate the UV or wetting agent into the lens formulation and subsequently process the formulation to form the lens. The formation of the lens generally involves curing the lens-forming materials in a mold. The presence of a UV absorber in the lens-forming materials can increase the cure time due to the absorbance of the UV moiety. This is generally undesirable when making ophthalmic lenses. Moreover, over time the UV absorbing moiety can leach from the lens, which reduces the overall UV absorbance properties of the lens over time. The methods described herein provide an efficient way to incorporate functional groups such as, for example, UV absorbing groups and hydrophilic materials to a lens.

SUMMARY

Described are methods for incorporating one or more functional compounds to an ophthalmic lens. In one aspect, the method involves (a) contacting the lens with a functional compound, wherein the functional compound comprises at least one group capable of forming a covalent bond with the lens upon exposing the lens to irradiation and/or heat; and (b) irradiating and/or heating the lens produced in step (a) to covalently attach the functional compound to the lens. In another aspect, the method involves (a) contacting the lens with a functional compound, wherein the functional compound comprises at least one group capable of undergoing oligomerization to produce an oligomer; and (b) irradiating and/or heating the lens produced in step (a) to produce the oligomer. In a further aspect, the functional compound can be covalently attached to the lens as well as incorporated into the lens as an oligomer. Also described herein are ophthalmic lens produced by the methods described herein.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
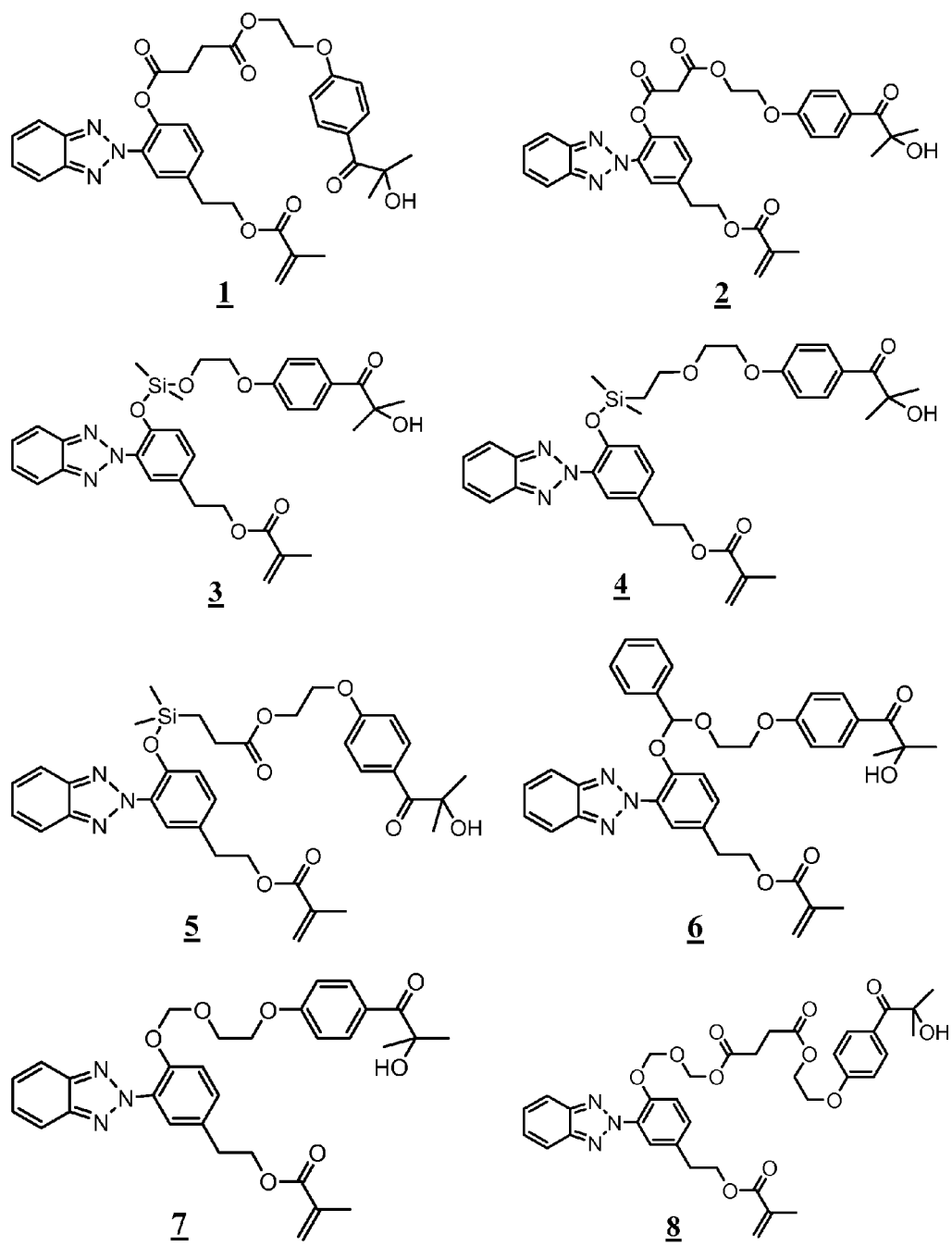
FIG. 1 shows the structures of several functional compounds useful herein.
Figure 1:
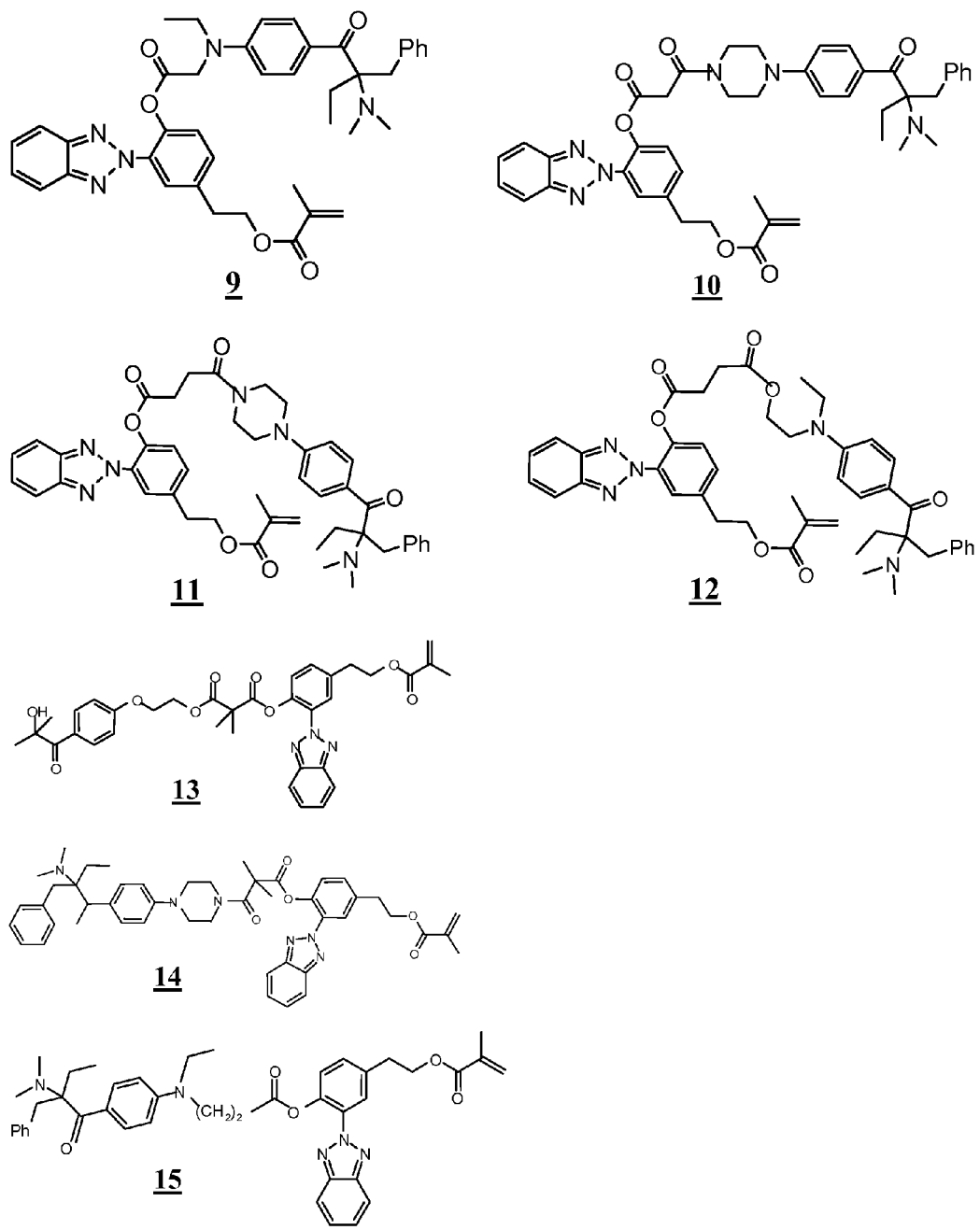
Figure 1:
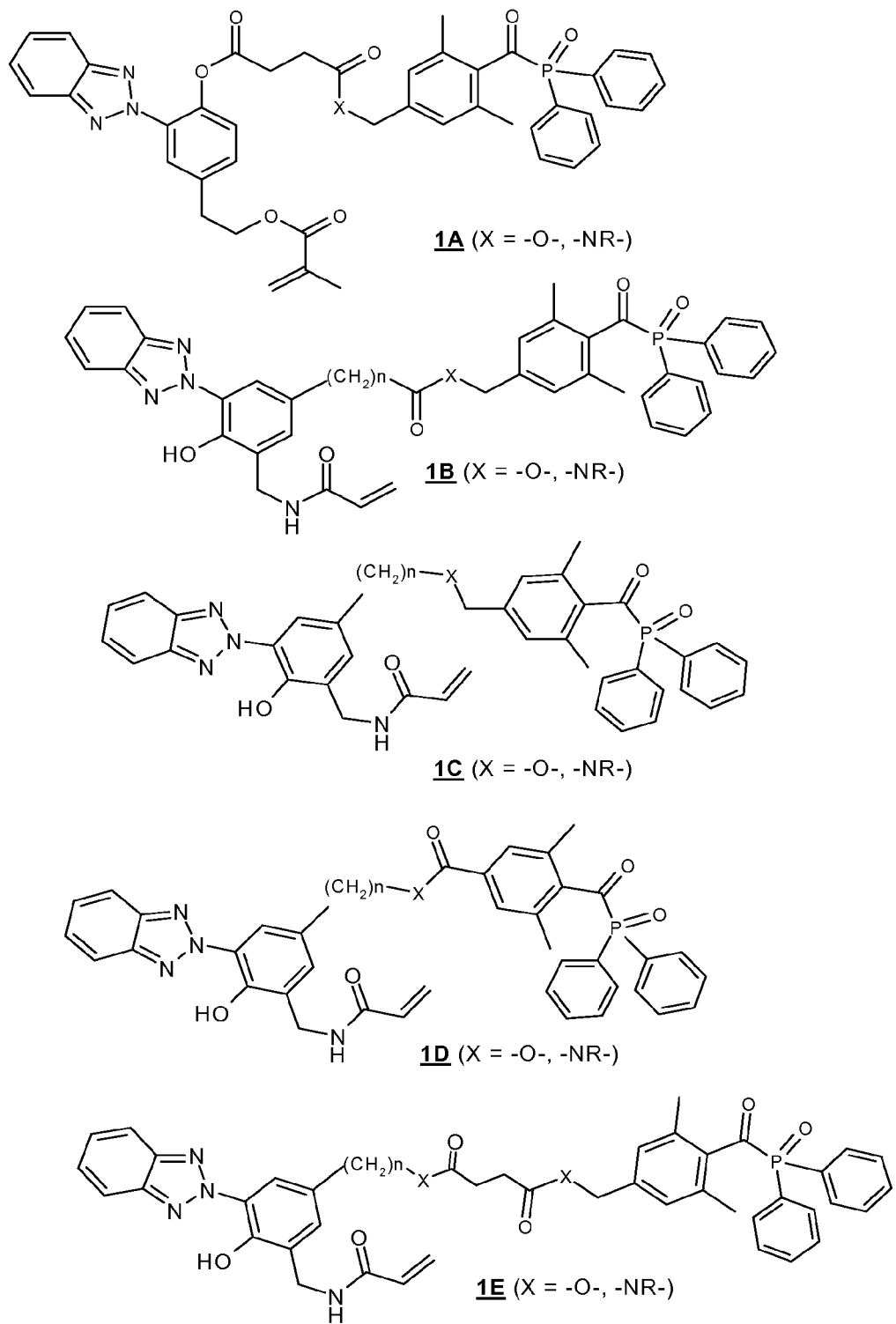
Figure 1:
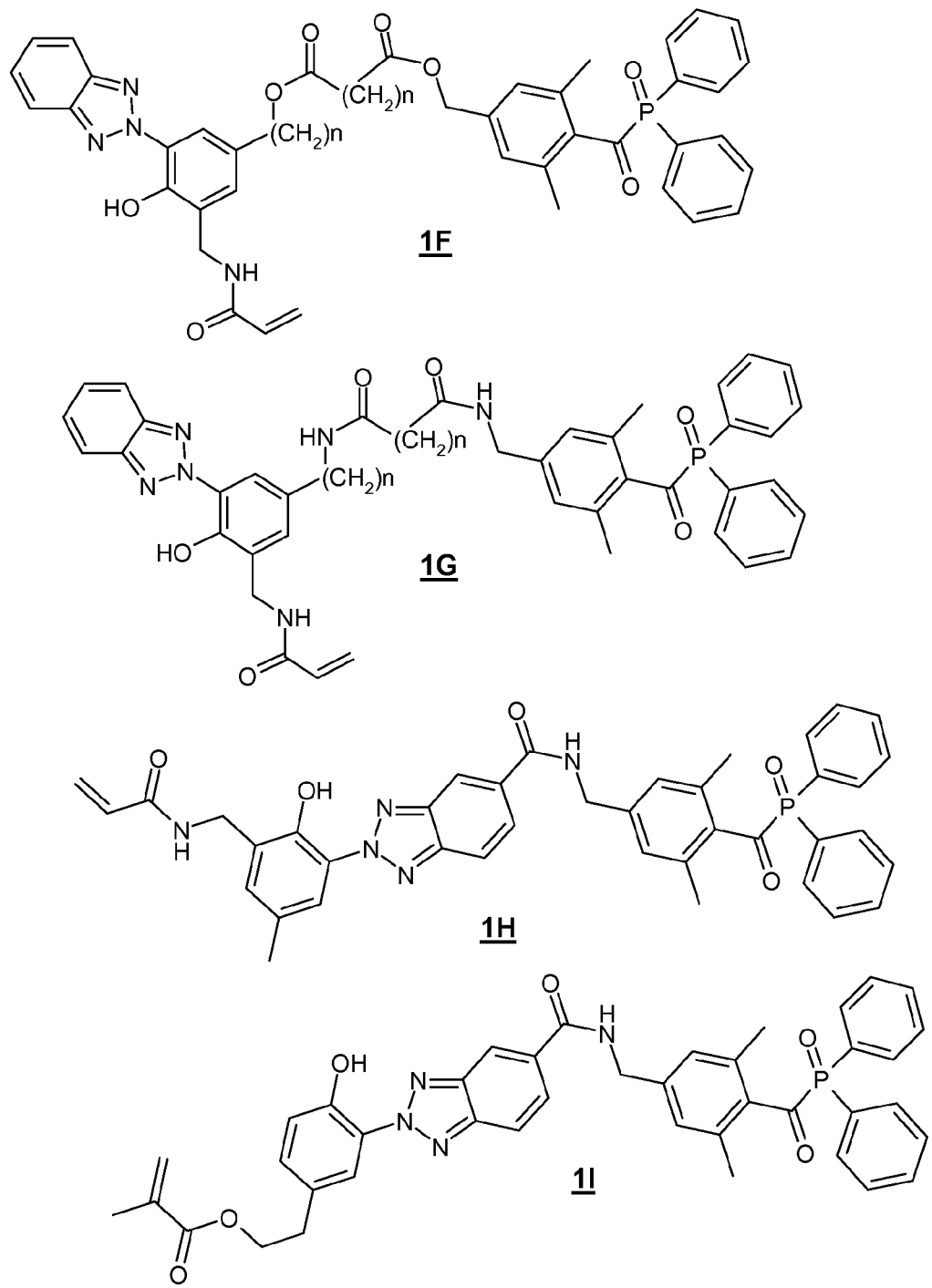
Figure 1:
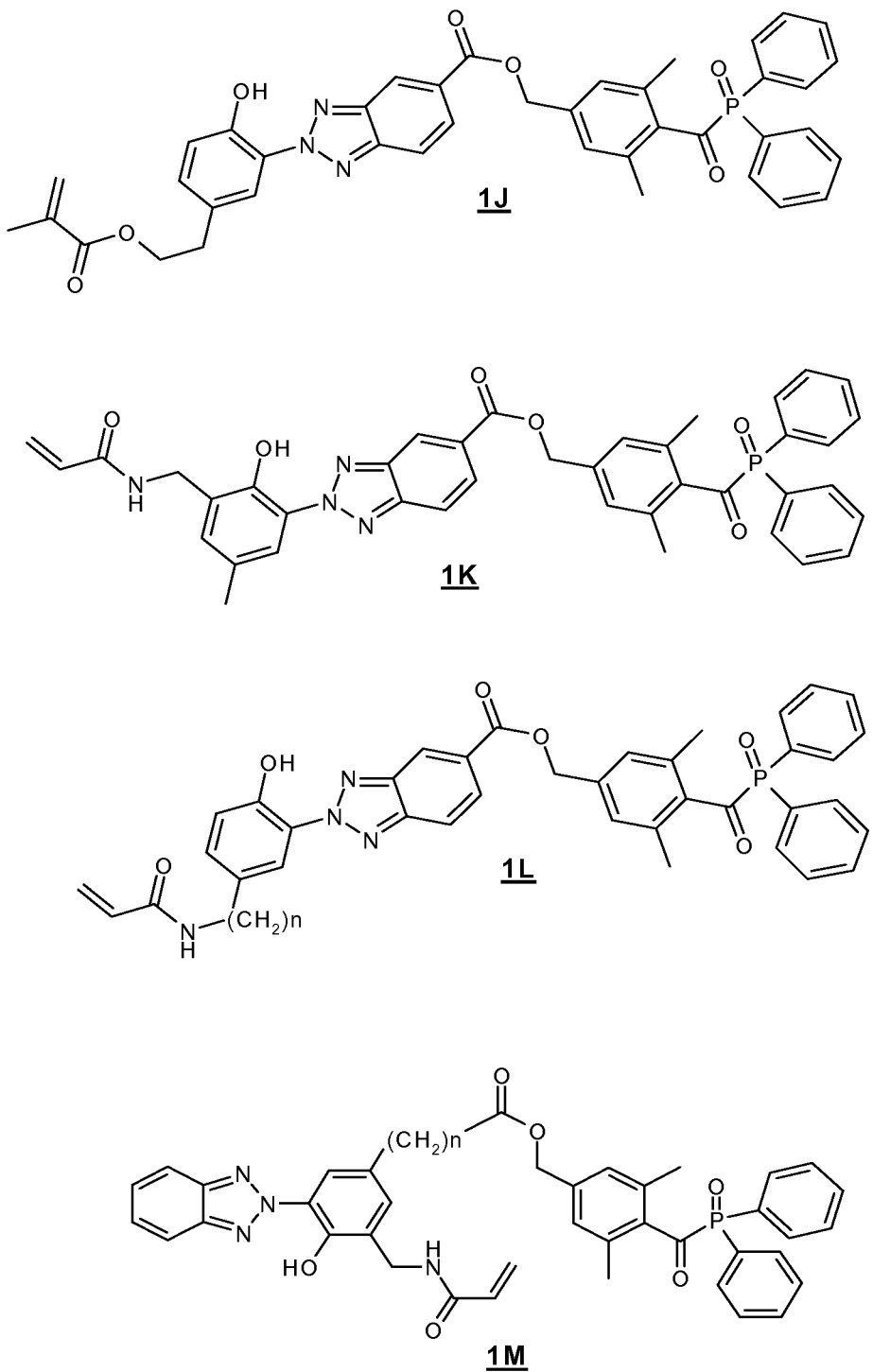
Figure 1:
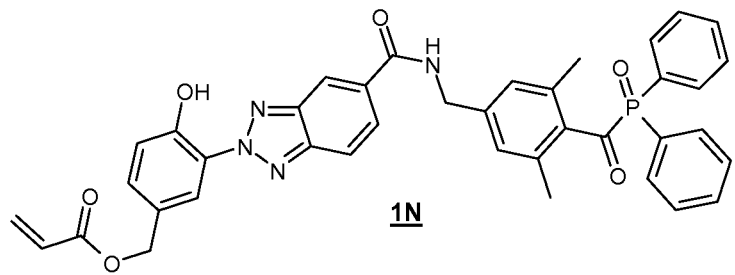
Figure 1:
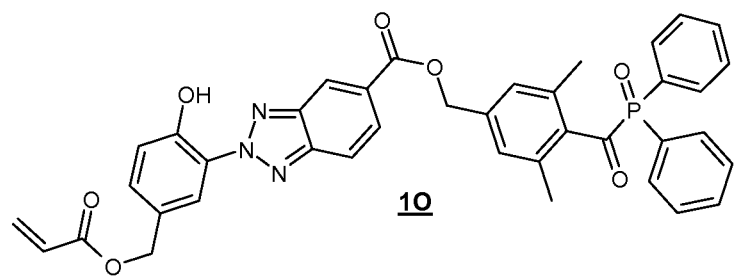
Figure 1:
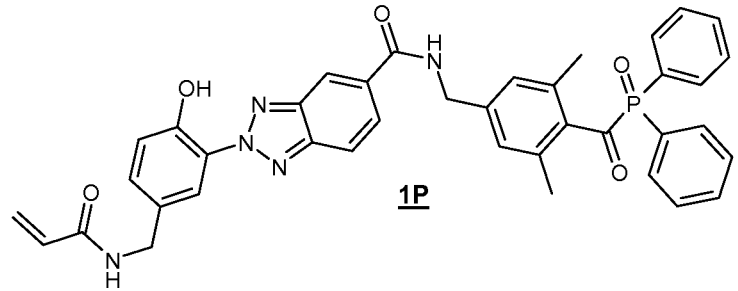
Figure 1:
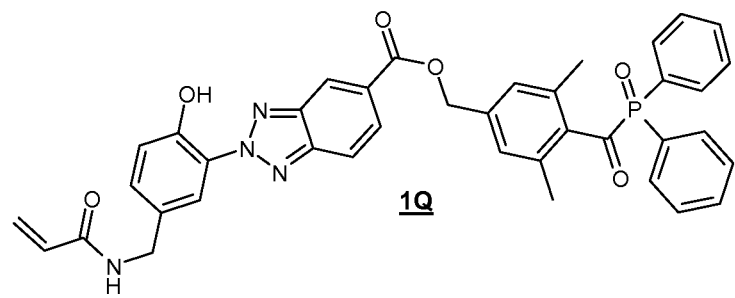
Figure 1:
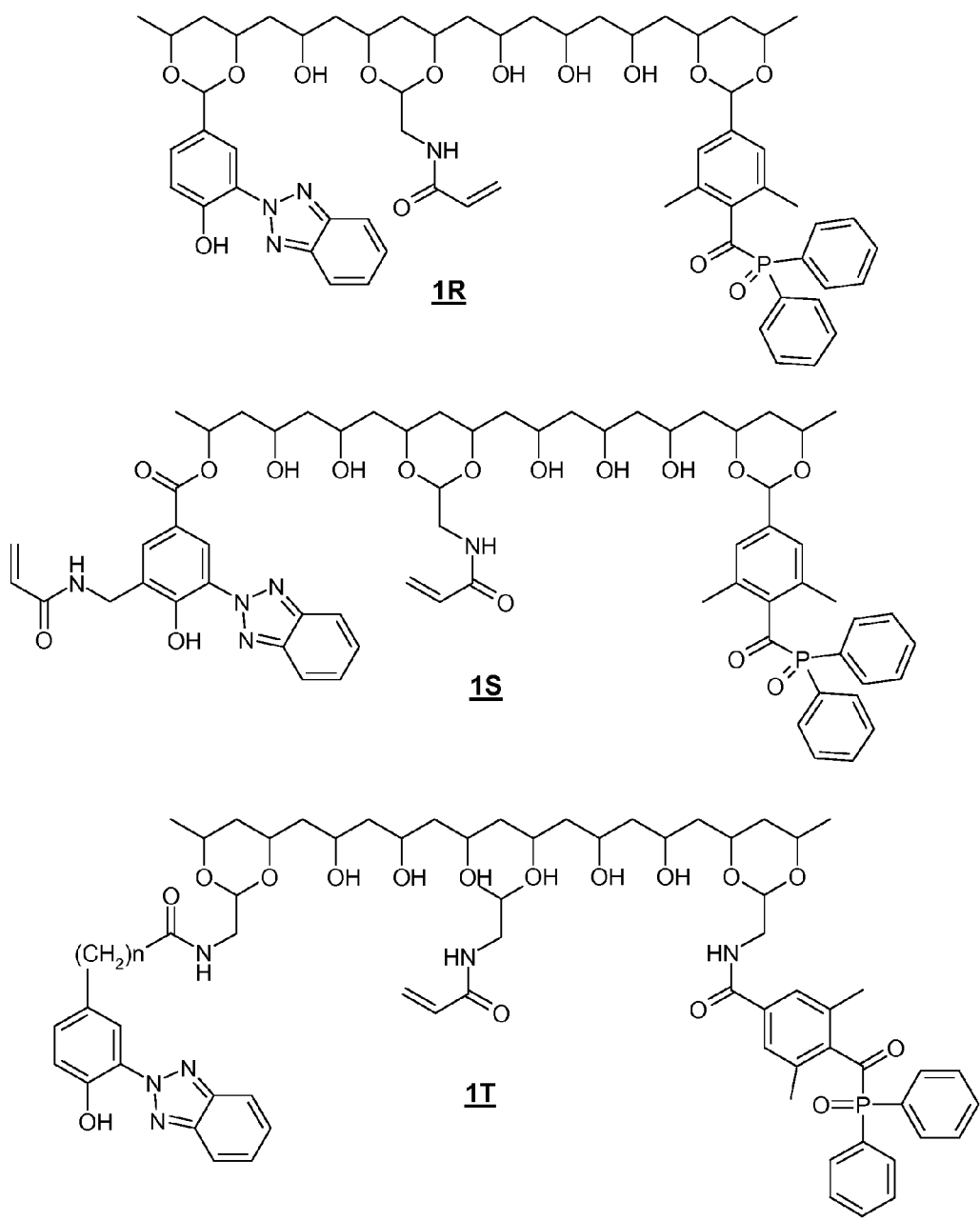
Figure 1:
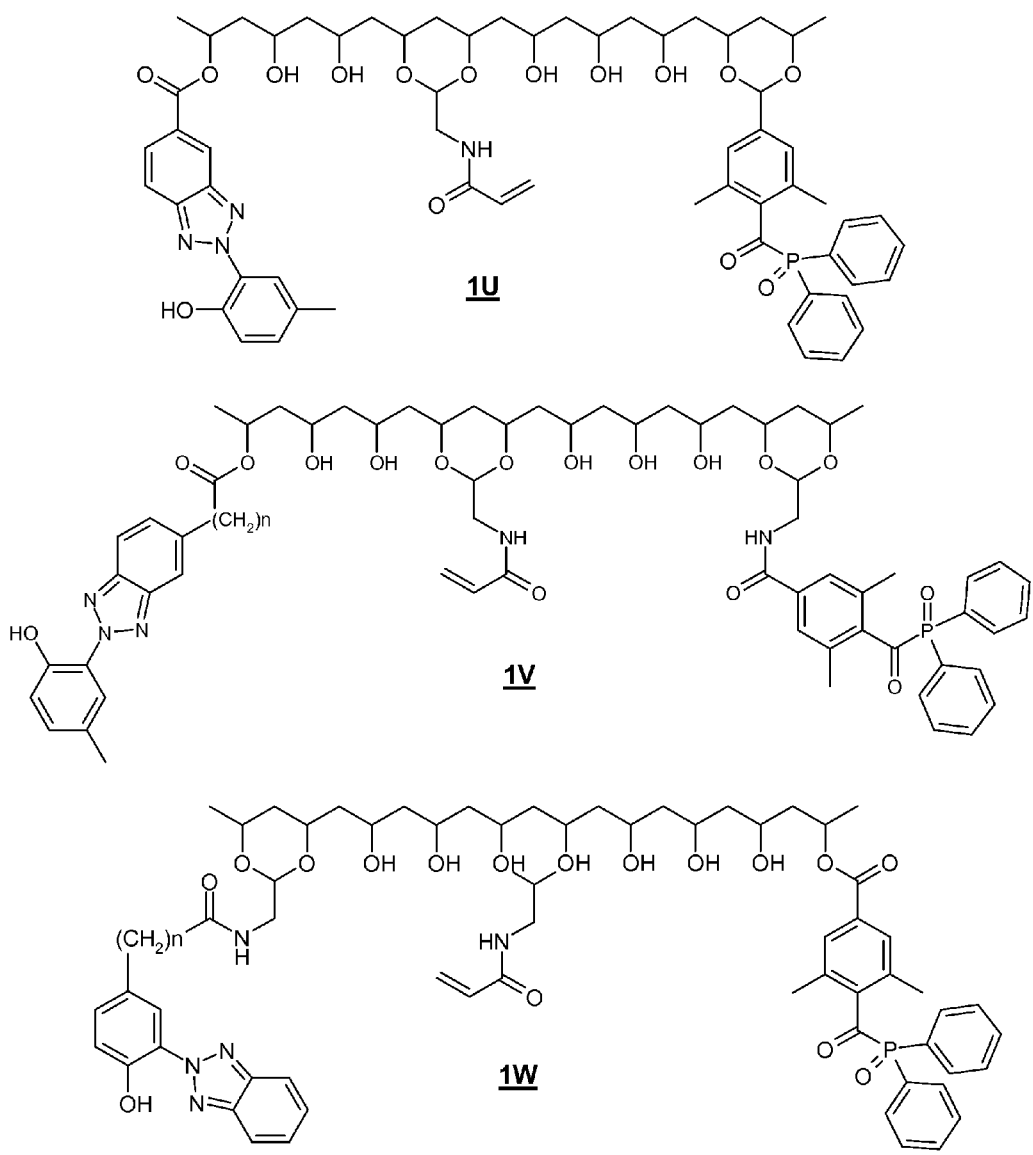
Figure 1:
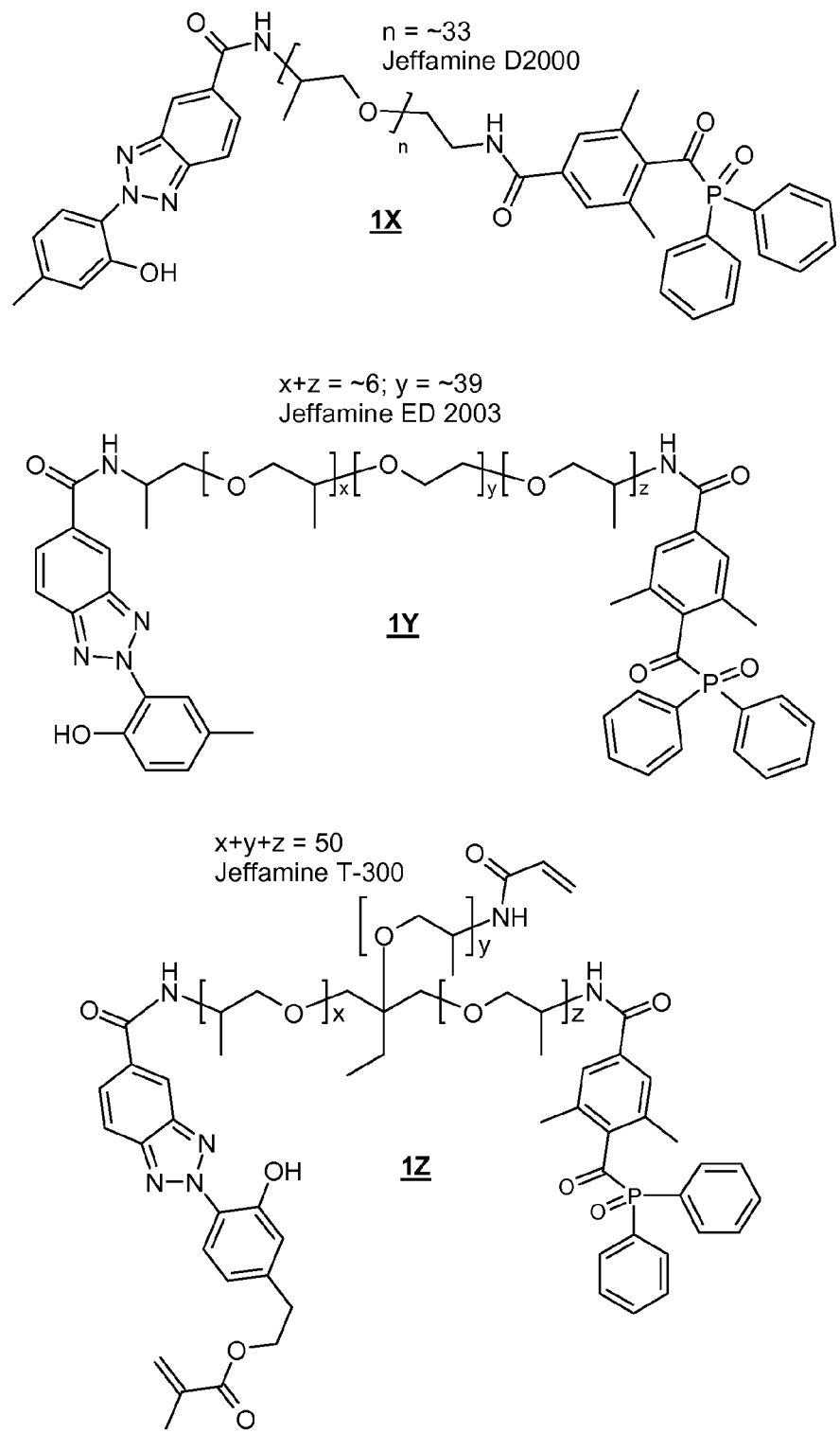

Before the present compounds, compositions, and methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a monomer" includes mixtures of two or more such monomers, and the like.

"Optional" or "optionally" means that the subsequently described event or circumstance can or cannot occur, and that the description includes instances where the event or circumstance occurs and instances where it does not. For example, the phrase "optional linker" means that the linker can or cannot be present.

Unless defined otherwise, all technical and scientific terms used herein have the same meaning as commonly understood by one of ordinary skill in the art to which this invention belongs. As employed throughout the disclosure, the following terms, unless otherwise indicated, shall be understood to have the following meanings.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "alkoxy group" as used herein has the formula —OR, where R is an alkyl group as defined herein.

The term "aryloxy group" as used herein has the formula —OR', where R' is an aryl group as defined herein.

The term "aralkyl group" as used herein has the formula —R—R', where R and R' are an alkyl group and aryl group, respectively, as defined herein. An example of an aralkyl group is a benzyl group (—CH$_2$Ph).

The term "amino group" as used herein has the formula —NRR', where R and R' are, independently, hydrogen, an alkyl group, or an aryl group.

The term "alkylene group" as used herein has the formula —(CH$_2$)$_n$—, where n is from 1 to 10.

The term "alkylene oxide group" as used herein is a group composed of one or more repeat units having the formula —(R$^a$)$_n$O—, where R$^a$ is a linear or branched C$_1$-C$_4$-alkylene and n is from 1 to 10.

The term "alkylene amine group" as used herein is a group composed of one or more repeat units having the formula —(R$^a$)$_n$NR—, where R$^a$ is a linear or branched C$_1$-C$_4$-alkylene, n is from 1 to 10, and R is hydrogen, an alkyl group, or an aryl group.

The term "carbonyl group" as used herein is a group or molecule composed of a C=O group. The carbonyl group can be present as an aldehyde, ketone, ester, anhydride, or carboxylic acid group.

The term "dicarbonyl group" as used herein is a group or molecule composed of two C=O groups. Each carbonyl group, independently, can be present as an aldehyde, ketone, ester, anhydride, or carboxylic acid group.

The term "silicon group" as used herein is a group or molecule composed of at least one silicon atom. The silicon group can be substituted with one or more alkyl groups, where the alkyl groups can be the same or different.

A "hydrogel" refers to a polymeric material that can absorb at least 10 percent by weight of water when it is fully hydrated. A hydrogel material can be obtained by polymerization or copolymerization of at least one hydrophilic monomer in the presence of or in the absence of additional monomers and/or macromers or by crosslinking of a prepolymer.

A "silicone hydrogel" refers to a hydrogel obtained by copolymerization of a polymerizable composition comprising at least one silicone-containing vinylic monomer or at least one silicone-containing macromer or a silicone-containing prepolymer.

"Hydrophilic," as used herein, describes a material or portion thereof that will more readily associate with water than with lipids.

The term "fluid" as used herein indicates that a material is capable of flowing like a liquid.

A "monomer" means a low molecular weight compound that can be polymerized actinically, thermally, or chemically. Low molecular weight typically means average molecular weights less than 700 Daltons.

As used herein, "actinically" in reference to curing or polymerizing of a lens-forming material means that the curing (e.g., crosslinked and/or polymerized) is performed by actinic irradiation, such as, for example, UV irradiation, visible light irradiation, ionized radiation (e.g. gamma ray or X-ray irradiation), microwave irradiation, and the like. Actinic curing methods are well-known to a person skilled in the art.

A "vinylic monomer," as used herein, refers to a low molecular weight compound that has an ethylenically unsaturated group and can be polymerized actinically, chemically or thermally. Low molecular weight typically means average molecular weights less than 700 Daltons.

A "hydrophilic vinylic monomer," as used herein, refers to a vinylic monomer that is capable of forming a homopolymer that can absorb at least 10 percent by weight water when fully hydrated. Suitable hydrophilic monomers are, without this being an exhaustive list, hydroxyl-substituted lower alkyl ($C_1$ to $C_8$) acrylates and methacrylates, acrylamide, methacrylamide, (lower alkyl)acrylamides and methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, N-methyl-3-methylidene-pyrrolidone, olefinically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like.

A "hydrophobic vinylic monomer," as used herein, refers to a vinylic monomer that is capable of forming a homopolymer that can absorb less than 10 percent by weight water.

A "macromer" refers to a medium to high molecular weight compound or polymer that contains functional groups capable of undergoing further polymerizing/crosslinking reactions. Medium and high molecular weight typically means average molecular weights greater than 700 Daltons. In one aspect, the macromer contains ethylenically unsaturated groups and can be polymerized actinically or thermally.

A "prepolymer" refers to a starting polymer that can be cured (e.g., crosslinked and/or polymerized) actinically or thermally or chemically to obtain a crosslinked and/or polymerized polymer having a molecular weight much higher than the starting polymer. An "actinically-crosslinkable prepolymer" refers to a starting polymer which can be crosslinked upon actinic radiation or heating to obtain a crosslinked polymer having a molecular weight much higher than the starting polymer.

The term "functional compound" is a compound that has one or more groups that possess a unique property or characteristic. Examples of such groups include, but are not limited to, a UV absorbing group, a hydrophilic group, an antimicrobial polymer, a mucin adsorbing group, or any combination thereof. Each group will be discussed in greater detail below.

The phrase "at least one group capable of forming a covalent bond with the lens upon exposing the lens to irradiation and/or heat" is defined herein as any group that when exposed to irradiation and/or heat can react directly with a group on the lens to form a covalent bond or, in the alternative, when exposed to irradiation and/or heat the group is subsequently converted to a another group that can form a covalent bond with the lens. Examples of these groups are provided below.

The term "olefinic group" is defined herein as any group containing at least one C=C group. Exemplary olefinic groups include without limitation acrylate, methacrylate, acrylamide, methacrylamide, allyl, vinyl, vinylester, or styrenyl. The olefinic groups are capable of being polymerized with other monomers or polymers having olefinic groups upon exposure with actinic radiation or heating.

The term "oligomer" is a compound that is the oligomerization product of multiple equivalents of functional compound. Here, the functional compound possesses one or more groups capable of reacting with one another to produce an oligomer. For example, the functional compound can possess olefinic groups described herein that can undergo oligomerization. Accordance with the present invention, the oligomerization product of multiple functional compounds has a size that can be entrapped in the surrounding matrix Described herein are methods for incorporating one or more functional compounds to an ophthalmic lens. In one aspect, the method involves (a) contacting the lens with a functional compound, wherein the functional compound comprises at least one group capable of forming a covalent bond with the lens upon exposing the lens to irradiation and/or heat; and (b) irradiating and/or heating the lens produced in step (a) to covalently attach the functional compound to the lens wherein the lens subjected to step a) and step b) treatment has an UVB absorbing capability characterized by having an UVB transmittance being at least 50 percentage, preferably 70 percentage, more preferably 90 percentage lower than that of the lens subjected to only step a) treatment when both lenses are extracted with methyl ethyl ketone for about 20 hours.

In another aspect, the method involves (a) contacting the lens with a functional compound, wherein the functional compound comprises at least one group capable of undergoing oligomerization to produce an oligomer; and (b) irradiating and/or heating the lens produced in step (a) to produce the oligomer wherein the lens subjected to step a) and step b) treatment has an UVB absorbing capability characterized by having an UVB transmittance being at least 50 percentage, preferably 70 percentage, more preferably 90 percentage lower than that of the lens subjected to only step a) treatment when both lenses are extracted with methyl ethyl ketone for about 20 hours.

The first step involves contacting the lens with the functional compound. A number of techniques can be used to contact the functional compound to the lens. In one aspect, the functional compound is sprayed on the lens. In this aspect, after the functional compound has been sprayed on the lens, the functional compound is allowed to soak into the lens for a sufficient time so that a sufficient amount of functional compound is incorporated in the lens.

In another aspect, the lens is dipped in a solution of the functional compound. In this aspect, the functional compound can be dissolved in one or more solvents. In one aspect, the solvent can be water. In other aspects, the solvent can be an organic solvent including, but limited to, alcohols (e.g., ethanol, isopropanol), ketones (e.g., methyl ethyl ketone), ethers, aldehydes, and the like.

The concentration of the functional compound can also vary depending upon the selection of the functional compound, the material of the lens, and the desired amount of functional compound to be attached to the lens. In one aspect, the solution has from 1% to 50% w/w, 5% to 40% w/w, 10% to 30% w/w, or 10% to 20% w/w functional compound/solvent. Other parameters that can be varied in order to optimize the amount of functional compound that is covalently attached to the lens include the pH of the dipping solution and the temperature at which the dipping step occurs. In certain aspects, if the pH and/or temperature are too high, the functional compound can be cleaved from the lens. An example of this is shown in Example 2 of the Examples. In one aspect, the lens is dipped in a solution comprising the functional compound having a pH from 5 to 8 and at a temperature less than 30° C.

After the lens has been contacted with the functional compound, optional steps can be performed prior to step (b). In one aspect, after step (a) and prior to step (b), the lens can be placed in water followed by removing the lens from the water and placing it in a female mold surface wherein the lens subjected to step a) and step b) treatment has an UV absorbing capability characterized by having an UVB transmittance being at least 50 percentage, preferably 70 percentage, more preferably 90 percentage lower than that of the lens subjected to only step a) treatment when both lenses are extracted with methyl ethyl ketone for about 20 hours.

Once the lens has been contacted with the functional compound, the lens is irradiated and/or heated in order to covalently attach the functional compound to the lens and/or incorporate the functional compound as an oligomer into the lens. The conditions for step (b) can vary depending upon the types of groups present on the functional compound. In one aspect, the functional compound has a photoinitiator covalently attached to the functional compound. In another aspect, the functional compound can possess one or more olefinic groups. Not wishing to be bound by theory, when the lens is exposed to light the photoinitiator and olefinic group can be converted to a reactive intermediate that can subsequently form a covalent bond with the lens. Alternatively, the functional group can be polymerized to produce an oligomer, where the oligomer is entrapped within the lens upon oligomerization (e.g, heating or irradiating). The oligomer can be partially to completely entrapped by the lens, which can vary on the amount of functional compound that is used and the duration at which the functional compound can permeate into the lens. In certain aspects, depending upon the selection of the functional compound, the functional compound can be covalently attached to the lens and incorporated within the lens as an oligomer. Examples of photoinitiators and olefinic groups useful herein are described in detail below. In certain aspects, the functional compounds described herein have a photoinitiator or an olefinic group directly bonded to the functional compound. Therefore, the methods described herein do not require the use of additional photoinitiators. For example, the methods described herein do not require contacting the lens with a separate photoinitiator followed by contacting the lens with the functional compound. Thus, the use of the functional compounds described herein only requires one contacting step instead of two separate steps.

In the case when the lens is irradiated in order to incorporate the functional compound to the lens, techniques will vary depending upon the selection of groups present on the functional compound. In one aspect, when the functional compound has one or more olefinic groups, the lens with the functional compound can be exposed to a spatial limitation of actinic radiation to covalently attach the functional compound to the lens. In another aspect when the functional compound has one or more initiators, the functional compound can be exposed to radiation and is converted to a reactive intermediate that can subsequently form a covalent bond with the lens and/or form an oligomer that is entrapped within the lens.

In other aspects, the energy used to covalently attach the functional compound to the lens and/or produce an oligomer of the functional compound is in the form of rays directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, UV radiation, visible light, gamma radiation, electron radiation or thermal radiation, the radiation energy preferably being in the form of a substantially parallel beam in order on the one hand to achieve good restriction and on the other hand efficient use of the energy. Exemplary procedures for irradiating the lenses in order to covalently attach functional compounds to the lens are provided in the Examples.

In other aspects, the lens with the functional compound can be subjected to heat in order to covalently attach the functional compound to the lens and/or produce an oligomer of the functional compound. For example, if the functional compound has a thermal initiator bonded to it, the lens can be exposed to heat such that the thermal initiator is converted to a reactive intermediate that can subsequently form a covalent bond with the lens and/or produce an oligomer.

After the functional compound has been covalently attached to the lens and/or incorporated into the lens as an oligomer, optional steps can be subsequently performed. In one aspect, the lens can be extracted in order to substantially remove any unreacted functional compound from the lens after step (b). Any of the solvents used in applying the functional compound to the lens can also be used in the extraction step. The extraction solvent can be the same or different than then solvent used in step (a). The extraction conditions can vary. In one aspect, the lens is extracted at 15° C. to 25° C. from less than a minute up to several hours. Exemplary procedures for extracting the lenses are provided in the Examples.

Depending upon the application of the lens, functional compounds possessing a variety of different functional groups can be used herein. In one aspect, the functional compound comprises an ultraviolet absorber, a photoinitiator directly or indirectly bonded to the ultraviolet absorber, and an olefinic group directly or indirectly bonded to the ultraviolet absorber. In one aspect, the functional compound comprises the formula I

I wherein
X comprises a photoinitiator;
Y comprises an olefinic group;
Z comprises an ultraviolet absorber; and
$L^1$ and $L^2$ comprise, independently, an optional linker.
Each component is described in detail below.

In one aspect, the ultraviolet absorber comprises a benzotriazole or a benzophenone. Many benzotriazole and benzophenone UV absorbers are known and many are commercially available. The identity of the benzotriazole or benzophenone UV absorber is not critical, but should be selected based on its characteristic UV cut-off to give the desired UV absorbing property. In one aspect, the benzotriazole UV absorber can be a hydroxyphenylbenzotriazole and the benzophenone UV absorber can be a hydroxyphenylbenzophenone. In one aspect, the UV absorber component of the functional compound has the formula X

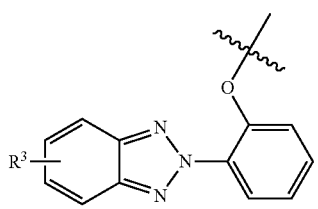
X wherein $R^3$ comprises hydrogen, an alkyl group, halogen or an alkoxy group.

In one aspect, the photoinitiator moiety comprises a phosphine oxide, a peroxide group, an azide group, an α-hydroxyketone, or an α-aminoketone. Other type 1 and type 2 initiators can be also used such as, for example, thioxanthones and benzildimethylketals Examples of phosphine oxide photoinitiators are depicted in formula XI

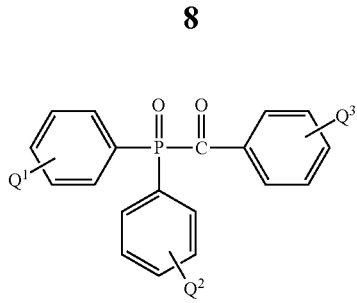
XI where $Q^1$-$Q^3$ are, independently, —H, —$CH_3$, —$CH_2CH_3$, —$CH(CH_3)CH_3$, or —$C(CH_3)_3$. The initiator moiety can be directly or indirectly bonded to the ultraviolet absorber component at any carbon atom in any of the aromatic groups in formula XI.

Examples of the peroxide groups useful as photoinitiator moieties are depicted in formula XII

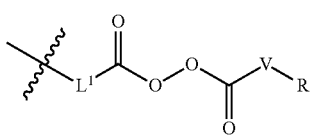
XII where V is absent or O, $L^1$ is defined herein, and R is an alkyl group such as, for example, —$(CH_2)_nH$ (n=1-18); —$CH(CH_3)CH_3$; —$C(CH_3)_3$; —$C_6H_5$; —$CH(CH_3)CH_2CH_3$; —$C(CH_3)_2CH_2C(CH_3)_3$; —$C(CH_3)_2(CH_2)_4H$, —$C(CH_2CH_3)_2(CH_2)_4H$; —$C(CH_3)_2(CH_2)_5H$; —$C(CH_2CH_3)_2(CH_2)_5H$; —$C(CH_3)_2(CH_2)_6H$; or —$C(CH_2CH_3)_2(CH_2)_6H$.

Examples of azide groups (—N═N—) are provided in International Publication No. WO 2004/062371. For example, 4,4'-azobis (4-cyanopentanoic acid) manufactured by Wako Chemicals can be used herein.

In other aspects, the photoinitiator moiety comprises an α-hydroxyketone or an α-aminoketone. For example, the photoinitiator comprises the formula IIa or b

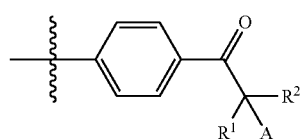
IIa

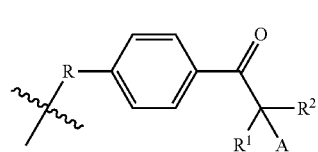
IIb wherein R, $R^1$ and $R^2$ are, independently, hydrogen, an alkyl group, an aryl group, an aralkyl group; and A comprises a hydroxyl group, an alkoxy group, an aryloxy group, or a substituted or unsubstituted amino group.

In other aspects, the photoinitiator moiety comprises the formula III or IVa or b

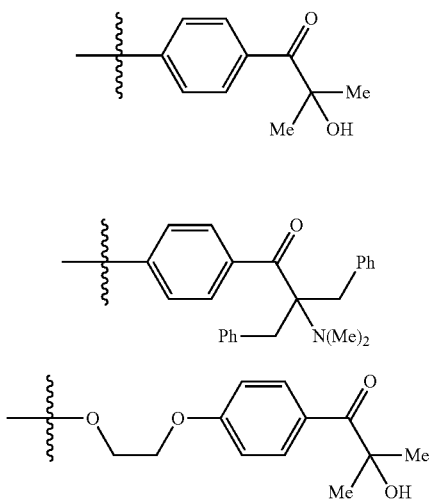

Functionalized α-hydroxyketones suitable for use as UV polymerization initiators are commercially available. For example, 2-hydroxy-1-[4-(2-hydroxy-ethoxy)phenyl]-2-methylpropan-1-one (Irgacure® 2959, Ciba Specialty Chemicals) contains a free primary hydroxyl group that can be used to directly or indirectly bond the photoinitiator to the ultraviolet absorber component. Other examples of commercially available α-hydroxyketones include, but are not limited to, Irgacure® 369 and 379 and Darocure 1173.

The functional compounds of formula I also include one or more olefinic groups. As described above, the olefinic groups are capable of forming covalent bonds with the lens and/or produce an oligomer of the functional compound upon exposure with actinic radiation or heating.

In certain aspects, when the photoinitiator and/or olefinic group in formula I are indirectly bonded to the ultraviolet absorber, a linker can be used. A variety of different groups can be used as the linker. The length of the linker can vary as well. Additionally, the selection of the linker can vary the hydrophilic/hydrophobic properties of the functional compound. This is particularly useful when certain solvents are used during the manufacturing of the ophthalmic lens. Examples of linkers ($L^1$ and/or $L^2$) useful herein include, but are not limited to, a silicon group, a carbonyl group, a dicarbonyl group, an alkylene group, an alkylene oxide group, an aralkyl group, an aryl group or alkylene amine group. Any combination of these groups is also contemplated. In one aspect, the linker can be a dicarbonyl group having the formula —C(O)$L^3$C(O)—, where $L^3$ is a linker as defined herein. In one aspect, $L^3$ is $(CH_2)_n$, where n is an integer from 1 to 6. In another aspect, $L^3$ is an alkylene oxide composed of one or more units having the formula —$(CH_2)_mO$—, where m is from 1 to 5. Other specific examples of linkers useful herein are described below. FIG. 1 also provides specific examples of functional compounds described herein that have specific linkers present in the compounds.

In one aspect, the functional compound comprises the formula V

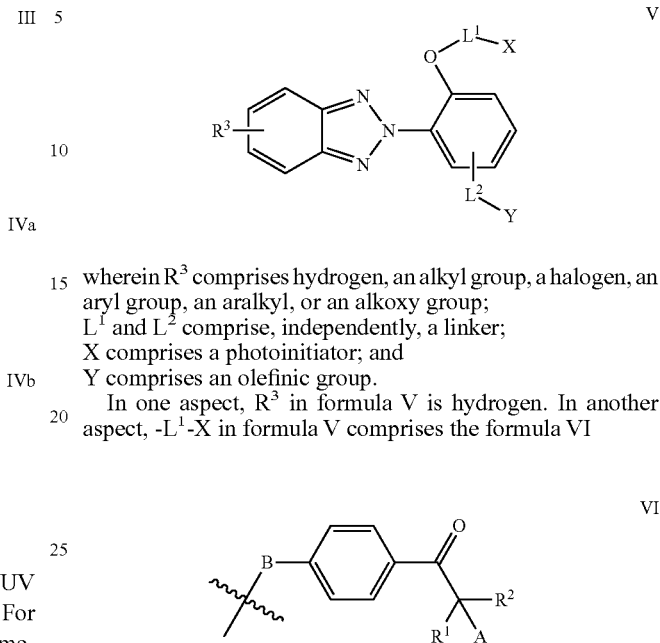

wherein $R^3$ comprises hydrogen, an alkyl group, a halogen, an aryl group, an aralkyl, or an alkoxy group;
$L^1$ and $L^2$ comprise, independently, a linker;
X comprises a photoinitiator; and
Y comprises an olefinic group.

In one aspect, $R^3$ in formula V is hydrogen. In another aspect, -$L^1$-X in formula V comprises the formula VI

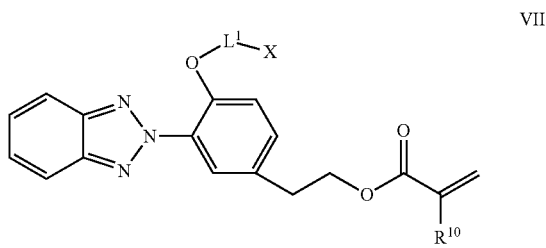

wherein $R^1$ and $R^2$ are, independently, hydrogen, an alkyl group, an aryl group, an aralkyl group;
A comprises a hydroxyl group, an alkoxy group, an aryloxy group, or a substituted or unsubstituted amino group; and
B comprises a silicon group, a carbonyl group, a dicarbonyl group, an alkylene group, an alkylene oxide group, an alkylene amine group, or any combination thereof. In a further aspect, -$L^2$-Y in formula V comprises the formula —$(CH_2)_tUC(O)C(R^4)$=$CH_2$, wherein t is from 1 to 3, U is O or NH, and $R^4$ is hydrogen or methyl.

In another aspect, the functional compound comprises the formula VII

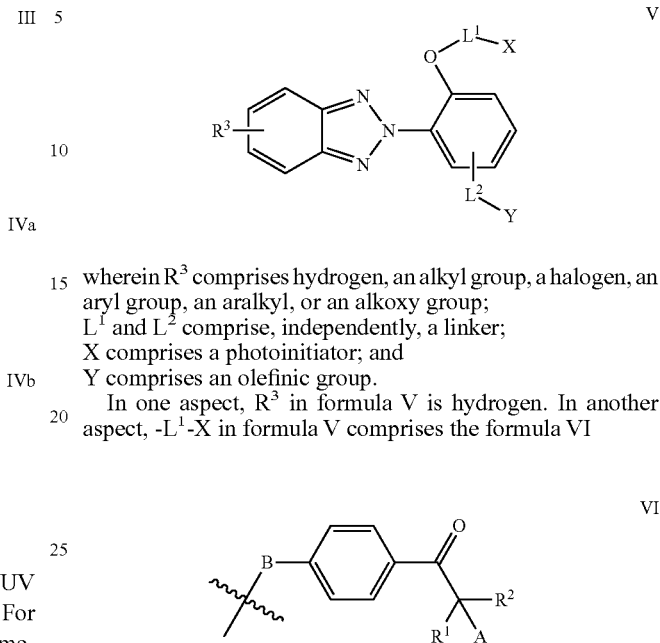

In one aspect, wherein $R^{10}$ is hydrogen or methyl. In another aspect, $L^1$ can be derived from any protecting group described herein including, for example, those provided in Table 1 below, which can be combined with alkyl, aralkyl, aryl, alkoxy, aryloxy, or aralkyloxy groups. In other aspects, $L^1$ can also comprise the formula

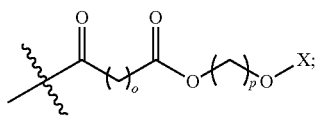

-continued

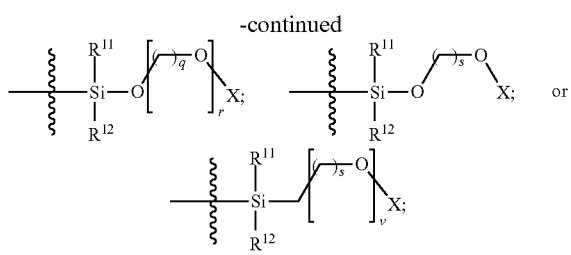

wherein o, p, q, r, s, u, and v are, independently, an integer from 1 to 5;
$R^{11}$ and $R^{12}$ are, independently, hydrogen or an alkyl group; and
X comprises the formula

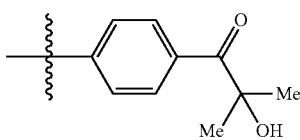 [SMILES: *c1ccc(C(=O)C(C)(C)O)cc1]

In one aspect, the functional compound comprises the formula VIII

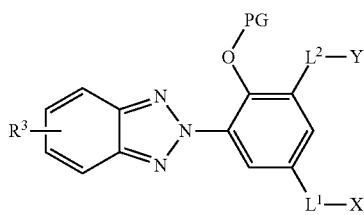    VIII wherein $R^3$ comprises hydrogen, an alkyl group, a halogen, an aryl group, an aralkyl group, or an alkoxy group;
$L^1$ and $L^2$ comprise, independently, a linker;
X comprises a photoinitiator;
Y comprises an olefinic group; and
PG comprises a protective group.

In another aspect, the functional compound comprises the formula IXa or b

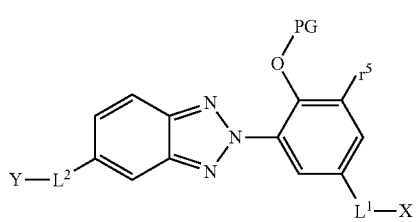

wherein $R^5$ comprises hydrogen, an alkyl group, or an alkoxy group;
$L^1$ and $L^2$ comprise, independently, a linker;
X comprises a photoinitiator;
Y comprises an olefinic group; and
PG comprises a protective group.

In one aspect, the functional compound comprises the formula X

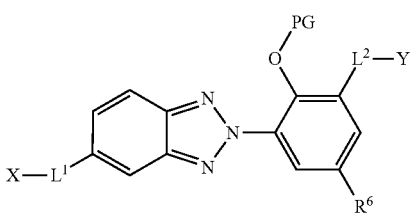    X wherein $R^6$ comprises hydrogen, an alkyl group, or an alkoxy group;
$L^1$ and $L^2$ comprise, independently, a linker;
X comprises a photoinitiator;
Y comprises an olefinic group; and
PG comprises a protective group.

In certain aspects, the UV absorber component of the functional compound can have one or more protecting groups that essentially prevent the absorption of energy by the UV absorber component. Thus, in this aspect, the protective group can render the UV absorber component essentially non-UV-absorbing. In general, the protective group is any group that can be readily cleaved using techniques known in the art. Examples of protecting groups include, but are not limited to, a silyl group or ester group. In one aspect, when a silyl group or carbonyl group is bonded to an aromatic oxygen, the silyl group or carbonyl group can be cleaved by varying the pH. A list of protecting groups and deprotection methods useful herein is provided in Table 1.

TABLE 1

| Protecting Group | Deprotection methods |
|---|---|
| Methyl Ether | pH < 1 and 100° C.; $RS^+$, $N_3^+$, $SCN^+$ and NaCN pH 12 nucleophilic reagents; $AlCl_3$ at 80° C. Lewis acids |
| Methoxymethyl Ether | pH 1; Zn/HCl 1 electron reductions; $AlCl_3$, $SnCl_4/BF_3$, and TsOH at 80° C. Lewis acids; HBr/In• free radical reactions; heat >350° C.; C+/olefin electrophilic reagents |
| 2-Methoxy-ethoxymethyl Ether | pH < 1; $AlCl_3$ at 80° C. and TsOH at 80° C. Lewis acids; heat >350° C. |
| Methylthiomethyl Ether | pH < 1; Zn/HCl and Zn/AcOH 1 electron reductions; $AlCl_3$ Lewis acids; Hg(II) soft acids, HBr/In• free radical reactions; heat >350° C. |
| Phenacyl Ether | pH < 1 and 100° C.; pH > 12 and 150° C.; Zn/HCl, Zn/AcOH, and Cr(II) at pH 5 1 electron reductions; $AlCl_3$ Lewis acids |
| Allyl Ether | pH < 1 and 100° C.; pH > 12 and 150° C.; $AlCl_3$ Lewis acid; $SeO_2$ at pH 2-4 oxidations |
| Cyclohexyl Ether | pH < 1 |
| t-Butyl Ether | pH 1; Zn/HCl 1 electron reductions; $AlCl_3$, $SnCl_4/BF_3$, and TsOH at 80° C. Lewis acids; heat >350° C.; C+/olefin electrophilic reagents |
| Benzyl Ether | pH 1; $H_2$/Raney (Ni), $H_2$/Pt pH 2-4, $H_2$/Rh and $H_2$/Pd catalytic reductions; $AlCl_3$ at 80° C. Lewis acids |

TABLE 1-continued

| Protecting Group | Deprotection methods |
|---|---|
| o-Nitrobenzyl Ether | pH < 1 and 100° C.; H$_2$/Raney (Ni), H$_2$/Pt pH 2-4, H$_2$/Rh and H$_2$/Pt catalytic reductions; AlCl$_3$ at 80° C. Lewis acids |
| 9-Anthrylmethyl Ether | pH < 1 and 100° C.; RS$^+$, N$_3^+$, SCN$^+$ nucleophilic reagents; H$_2$/Raney (Ni), H$_2$/Pt pH 2-4, H$_2$/Rh and H$_2$/Pd catalytic reductions; AlCl$_3$ at 80° C. Lewis acids |
| 4-Picolyl Ether | pH < 1 and 100° C.; H$_2$/Raney (Ni), H$_2$/Pt pH 2-4, H$_2$/Rh and H$_2$/Pd catalytic reductions; AlCl$_3$ Lewis acids |
| t-Butyl-dimethylsilyl Ether | pH from 2-4; pH > 12 at 150° C.; H$_2$/Pt pH 2-4 catalytic reductions; Zn/HCl 1 electron reductions; AlCl$_3$ at 80° C. and TsOH at 80° C. Lewis acids; HBr/In• free radical reactions |
| Aryl Acetate | pH 1; pH from 8.5 to 10; CH$_3$S(O)CH$_2^-$Na$^+$ and NaNH$_2$ bases; MeONa, enolate, NH$_3$/RNH$_2$, and NaCN pH 12 nucleophiles; LiAlH$_4$, Li-s-Bu$_3$BH, i-Bu$_2$AlH hydride reductions; TsOH at 80° C. Lewis acids; H$_2$O$_2$ at pH 10-12 and NaOCl at pH 10 oxidations; and K$_2$CO$_3$/MeI |
| Aryl Pivaloate | pH < 1 and 100° C.; pH > 12 at 150° C.; LiAlH$_4$ hydride reductions; heat >350° C.; |
| Aryl Benzoate | pH 1; pH > 12; CH$_3$S(O)CH$_2^-$Na$^+$ and NaNH$_2$ bases; NaCN pH 12 nucleophiles; LiAlH$_4$ and i-Bu$_2$AlH hydride reductions; TsOH at 80° C. Lewis acids; H$_2$O$_2$ at pH 10-12 oxidations |
| Aryl 9-Fluorene-carboxylate | pH < 1 and 100° C.; pH > 12; NaNH$_2$ bases; NaCN pH 12 nucleophiles; LiAlH$_4$, Li-s-Bu$_3$BH, and i-Bu$_2$AlH hydride reductions; AlCl$_3$ and TsOH at 80° C. Lewis acids |
| Aryl Methyl Carbonate | pH from 2-4; pH > 12; CH$_3$S(O)CH2$^-$Na$^+$ and NaNH$_2$ bases; RS$^+$, N$_3^+$, SCN$^+$ and NaCN pH 12 nucleophilic reagents; RLi and RMgX organometallic reagents; H$_2$/Pt pH 2-4 catalytic reductions; Zn/HCl and Zn/AcOH 1 electron reductions; LiAlH$_4$ and i-Bu$_2$AlH hydride reductions; AlCl$_3$ and TsOH at 80° C. Lewis acids; HBr/In• free radical reactions; CrO$_3$ at pH 1; SeO2 at pH 2-4 oxidations; heat >350° C. |
| Aryl 2,2,2-Tri-chloroethyl Carbonate | pH < 1 and 100° C.; pH from 10-12; NaNH$_2$ bases; NaCN pH 12 nucleophiles; RLi and RMgX organometallic reagents; Zn/HCl, Zn/AcOH, and Cr(II) at pH 5 1 electron reductions; LiAlH$_4$ and i-Bu$_2$AlH hydride reductions; AlCl$_3$ and TsOH at 80° C. Lewis acids; heat >350° C.; K$_2$CO$_3$/MeI |
| Aryl Vinyl Carbonate | pH < 1 and 100° C.; pH from 10-12; CH$_3$S(O)CH$_2^-$Na$^+$ and NaNH$_2$ bases; and NaCN pH 12 nucleophilic reagents; RLi and RMgX organometallic reagents; Zn/HCl 1 electron reductions; LiAlH$_4$ and i-Bu$_2$AlH hydride reductions; AlCl$_3$ and TsOH at 80° C. Lewis acids; Hg(II) soft acids; heat >350° C.; K$_2$CO$_3$/MeI |
| Aryl Benzyl Carbonate | pH < 1; pH > 12; CH$_3$S(O)CH$_2^-$Na$^+$ and NaNH$_2$ bases; NaCN pH 12 nucleophilic reagents; RLi and RMgX organometallic reagents; H$_2$/Raney (Ni), H$_2$/Pt pH 2-4, and H$_2$/Pd catalytic reductions; LiAlH$_4$ and i-Bu$_2$AlH hydride reductions; AlCl$_3$ and TsOH at 80° C. Lewis acids; heat >350° C. |
| Aryl Methansulfonate | pH > 12; CH$_3$S(O)CH$_2^-$Na$^+$ bases; RLi organometallic reagents; AlCl$_3$ at 80° C. Lewis acids; |

Methods for deprotecting the compound when a protecting group is present include, for example, dipping the finished ophthalmic lens in a highly basic solution. In one aspect, the lens can be dipped in an aqueous solution having a pH greater than 10, greater than 11, or greater than 12 followed by drying. In other aspects, deprotection can be accomplished by exposing the device to heat. For example, the lens can be placed in an autoclave and heated for a sufficient time and temperature to cleave the protecting group.

The functional compounds having the general formula I described can be synthesized using techniques known in the art. The methods disclosed in U.S. Published Application No. 2010/0168359 can be used to make the functional compounds having the general formula I. Numerous examples of functional compounds having the formula I are provided in FIG. 1.

In another aspect, the functional compound comprises a hydrophilic polymer bonded to a photoinitiator via a linker. In one aspect, the hydrophilic polymer comprises a poly(N-vinyl lactam), a polyacrylamide, a cellulose compound, a polyacrylic acid, a polymethacrylic acid, or a polyvinyl ether. In another aspect, the hydrophilic polymer comprises polyethylene glycol, poly(vinylpyrrolidone) (PVP), methyl cellulose, polyvinyl alcohol, poly(ethylene oxide) (PEO), polypropylene oxide) (PPO).

Any of the linkers and photoinitiators described herein can be used in this embodiment. In one aspect, the photoinitiator comprises a phosphine oxide, a peroxide group, an azide group, an α-hydroxyketone, or an α-aminoketone. In another aspect, the linker comprises a silicon group, a carbonyl group, a dicarbonyl group, an alkylene group, an alkylene oxide group, an alkylene amine group, or any combination thereof.

In one aspect, the functional compound comprises the formula XV

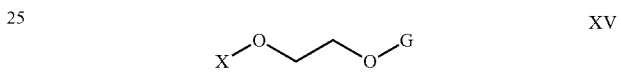

XV wherein X is any photoinitiator described herein; and
G is a hydrophilic polymer.

In one aspect, X in formula XV is

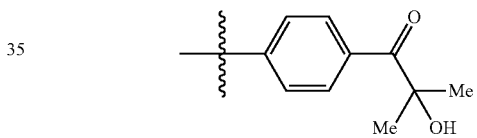

In another aspect, the functional compound comprises the formula XVI

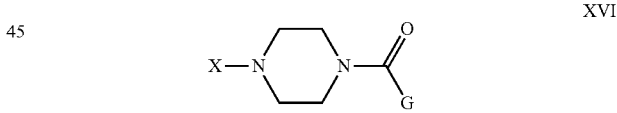

XVI wherein X is any photoinitiator described herein; and
G is a hydrophilic polymer.

In one aspect, X in formula XVI is formula III, Iva, or IVb described above.

In one aspect, the functional compound comprises the formula XVII

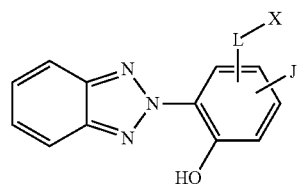

XVII wherein L is any linker described herein;
X is any photoinitiator described herein; and
J is a mucin adsorbing unit.

In one aspect, X in formula XVII is formula XI described above.

In another aspect, the functional compound comprises an ultraviolet absorber bonded to a photoinitiator by a linker. In one aspect, the functional compound comprises the formula XVIII

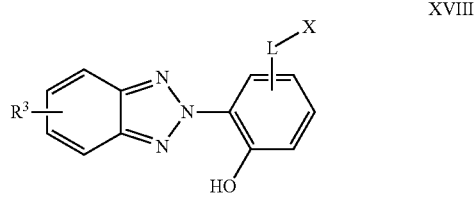

wherein $R^3$ comprises hydrogen, an alkyl group, a halogen, an aryl group, an aralkyl group, or an alkoxy group;
L is any linker described herein; and
X is any photoinitiator described herein.

In one aspect, X in formula XVIII is formula XI described above.

The ophthalmic lens can be made from a variety of different lens-forming materials. The term "lens-forming material" is defined herein as any material that is capable of being polymerized using techniques known in the art. The lens-forming material can be a monomer, a prepolymer, a macromolecule or any combination thereof.

In one aspect, the lens-forming material comprises a prepolymer. For example, a fluid prepolymer composition comprising at least one actinically-crosslinkable or thermally-crosslinkable prepolymer can be used. In one aspect, the fluid prepolymer composition is an aqueous solution comprising at least one actinically-crosslinkable prepolymer. It is understood that the prepolymer composition can also include one or more vinylic monomers, one or more vinylic macromers, and/or one or more crosslinking agents. However, the amount of those components should be low such that the final ocular device does not contain unacceptable levels of unpolymerized monomers, macromers and/or crosslinking agents. The presence of unacceptable levels of unpolymerized monomers, macromers and/or crosslinking agents will require extraction to remove them, which requires additional steps that are costly and inefficient.

Examples of actinically crosslinkable prepolymers include, but are not limited to, a water-soluble crosslinkable poly(vinyl alcohol) prepolymer described in U.S. Pat. Nos. 5,583,163 and 6,303,687 (incorporated by reference in their entireties); a water-soluble vinyl group-terminated polyurethane prepolymer described in U.S. Patent Application Publication No. 2004/0082680 (herein incorporated by reference in its entirety); derivatives of a polyvinyl alcohol, polyethyleneimine or polyvinylamine, which are disclosed in U.S. Pat. No. 5,849,841 (incorporated by reference in its entirety); a water-soluble crosslinkable polyurea prepolymer described in U.S. Pat. No. 6,479,587 and in U.S. Published Application No. 2005/0113549 (herein incorporated by reference in their entireties); crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra(meth)acrylate prepolymers disclosed in EP 961,941 and U.S. Pat. No. 6,221,303; crosslinkable polyallylamine gluconolactone prepolymers disclosed in International Application No. WO 2000/31150 and U.S. Pat. No. 6,472,489; and silicone-containing prepolymers are those described in commonly-owned U.S. Pat. Nos. 6,039,913, 7,091,283, 7,268,189 and 7,238,750.

In another aspect, the lens-forming material is a polymerizable composition comprising at least a hydrophilic vinylic monomer including, but not limited to, hydroxyalkyl methacrylate, hydroxyalkyl acrylate, N-vinyl pyrrolidone, N-methyl-3-methylidene-pyrrolidone, allyl alcohol, N-vinyl alkylamide, N-vinyl-N-alkylamide, acrylamide, methacrylamide, (lower alkyl)acrylamides and methacrylamides, and hydroxyl-substituted (lower alkyl)acrylamides and -methacrylamides. The polymerizable composition can further comprise one or more hydrophobic vinylic monomers, crosslinking agents, radical initiators, and other components know to a person skilled in the art. These materials typically require extraction steps.

In another aspect, the lens-forming material is a silicone-containing prepolymer. Examples of silicone-containing prepolymers are those described in U.S. Pat. Nos. 6,039,913, 7,091,283, 7,268,189 and 7,238,750, US patent application publication Nos. US 2005/0237483 A1 and 2008/0015315 A1, co-pending U.S. patent application Ser. Nos. 12/001,562, 12/001,521, 60/896,326, and 60/896,325, which are incorporated herein by references in their entireties.

In another aspect, the lens-forming material is a polymerizable composition comprising at least one silicon-containing vinylic monomer or macromer, or can be any lens formulations for making soft contact lenses. Exemplary lens formulations include without limitation the formulations of lotrafilcon A, lotrafilcon B, confilcon, balafilcon, galyfilcon, senofilcon A, and the like. A lens-forming material can further include other components, such as, a hydrophilic vinylic monomer, crosslinking agent, a hydrophobic vinylic monomer, a visibility tinting agent, photosensitizers, an antimicrobial agent, and the like.

In one aspect, the lens-forming material can be any silicone-containing vinylic monomers. Examples of silicone-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, monoacrylated polydimethylsiloxane, mercapto-terminated polydimethylsiloxane, and tristrimethylsilyloxysilylpropyl methacrylate (TRIS), N-[tris(trimethylsiloxy)silylpropyl] methacrylamide ("TSMAA"), N-[tris(trimethylsiloxy)silyl-propyl]acrylamide ("TSAA"), 2-propenoic acid, 2-methyl-, 2-hydroxy-3-[3-[1,3,3,3-tetramethyl-1-[(trimethylsilyl)oxy] disiloxanyl]propoxy]propyl ester (which can also be named (3-methacryloxy-2-hydroxypropyloxy)propylbis(trimethyl-siloxy)methylsilane), (3-methacryloxy-2-hydroxypropyloxy)propyltris(trimethylsiloxy)silane, bis-3-methacryloxy-2-hydroxypropyloxypropyl polydimethylsiloxane, 3-methacryloxy-2-(2-hydroxyethoxy)propyloxy)propylbis (trimethylsiloxy)methylsilane, N,N,N',N'-tetrakis(3-methacryloxy-2-hydroxypropyl)-alpha, omega-bis-3-aminopropyl-polydimethylsiloxane, polysiloxanylalkyl(meth)acrylic monomers, silicone-containing vinyl carbonate or vinyl carbamate monomers (e.g., 1,3-bis[4-vinyloxycarbonyloxy)but-1-yl]tetramethyl-disiloxane; 3-(trimethylsilyl), propyl vinyl carbonate, 3-(vinyloxycarbonylthio)propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethylsiloxyethyl vinyl carbonate; trimethylsilylethyl vinyl carbonate, and trimethylsilylmethyl vinyl carbonate). A preferred siloxane-containing monomer is TRIS and TSAA, which is referred to 3-methacryloxypropyltris(trimethylsiloxy)silane, and represented by CAS No. 17096-07-0. The term "TRIS" also includes dimers of 3-methacryloxypropyltris(trimethylsiloxy)silane. Monomethacrylated or monoacrylated polydimethylsiloxanes of various molecular weight could be used. An example of another siloxane-containing monomer useful herein is TSAA. Dimethacrylated or diacrylated polydimethylsiloxanes of various molecular weight could also be used. For photo-curable binder polymer, the silicon containing monomers used in the preparation of binder polymer will preferably have good hydrolytic (or nucleophilic) stability.

In other aspects, siloxane-containing macromers with ethylenically unsaturated group(s) can be used to produce a silicone hydrogel material, which are useful as lens-forming materials. A particularly preferred siloxane-containing macromer is selected from the group consisting of Macromer A, Macromer B, Macromer C, and Macromer D described in U.S. Pat. No. 5,760,100, herein incorporated by reference in its entirety. In other aspects, the macromer can be CE PDMS and L21 (Atlas material). Macromers could be mono or difunctionalized with acrylate, methacrylate or vinyl groups. Macromers that contain two or more polymerizable groups (vinylic groups) can also serve as cross linkers. Di and triblock macromers consisting of polydimethylsiloxane and polyakyleneoxides could also be of utility. For example one might use methacrylate end capped polyethyleneoxide-block-polydimethylsiloxane-block-polyethyleneoxide to enhance oxygen permeability.

In one aspect, the ophthalmic lens is a contact lens or an intraocular lens. In another aspect, when the lens is a contact lens, the lens is a silicon hydrogel.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

UV Transmission

The UV Transmission of a lens is measured according to the test method as described in ISO 18369-3:2006, section 4.6. The UV Transmission of a lens is measured with Varian CARY 3E UV-Visible Spectrophotometer, equipped with Labsphere DRA-CA-302 integrating sphere accessory, with Custom-designed 6 mm aperture lens centering holder and quartz cell attachment, (from Precision Concepts, 1525 Bluegrass Lakes Parkway, Alpharetta, Ga. 30004).

Example 1

Preparation of Chain-Extended Polydimethylsiloxane Vinylic Macromer with Terminal Methacrylate Groups (CE-PDMS Macromer)

In the first step, $\alpha,\omega$-bis(2-hydroxyethoxypropyl)-polydimethylsiloxane (Mn=2000, Shin-Etsu, KF-6001a) is capped with isophorone diisocyanate (IPDI) by reacting 49.85 g of $\alpha,\omega$-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of $\alpha,\omega$-bis(2-hydroxyethoxypropyl)-polydimethylsiloxane (Mn=3000, Shin-Etsu, KF-6002) and 50 g of dry MEK is added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxylgroups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2\times10^{-2}$ mBar). Then, under an atmosphere of dry nitrogen, 320 g of distilled MEK is then added into the reactor and the mixture was stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK is then added and stirred until a homogeneous solution is formed. 0.235 g of DBTDL are added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Example 2

Preparation of Lens Formulations

A lens formulation is prepared by dissolving components in 1-propanol to have the following composition: 30.9% by weight of CE-PDMS macromer prepared in Example 2, 21.8% by weight of N-[tris(trimethylsiloxy)-silylpropyl] acrylamide (TRIS-Am), 16.0% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 6.3% by weight 2-Hydroxyethyl acrylate (HEA), 0.2% by weight N,N'-Methylene bisacrylamide (MBA), and 23.3% by weight of 1-propanol.

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a male mold half made of quartz (or $CaF_2$) and a female mold half made of glass (or PMMA). The UV irradiation source is a Hamamatsu lamp with the WG330+TM297 cut off filter at an intensity of about 16 mW/cm$^2$. The lens formulation in the mold is irradiated with UV irradiation for about 27 seconds. Cast-molded lenses are stored in deionized water until further treatment.

Example 3

A contact lens of example 2 is dipped for 120 s in a 10% (w/w) solution of functional compound 11 in FIG. 1 in methyl ethyl ketone (MEK). The lens is removed and re-equilibrated in deionized water. Subsequently the lens is placed on a female mold surface. Using a Hamamatsu high pressure mercury lamp system the lens is exposed to light in the amount of 10 mW/cm$^2$ (ESE UVB sensor with 297 nm long pass filter in place and ~16% lamp intensity) for 120 seconds. The lens undergoes a 20 hour extraction step in MEK and the UV/VIS transmission is measured. A control contact lens of example 2 is dipped for 120 s in a 10% (w/w) solution of functional compound 11 in FIG. 1 in methyl ethyl ketone (MEK). The lens is removed, re-equilibrated in deionized water, extracted for 20 hours in MEK and the UV/VIS transmission is measured. The lens is not subsequently exposed to UV light as is done with the previous lens.

The lens exposed to UV light shows a 14.6% UVA and 0.6% UVB and 95.3% luminous transmittance versus 88.1% UVA and 74.7% UVB and 97.9% luminous transmittance compared to the not UV light exposed control lens.

Example 4

A contact lens of example 2 is dipped for 60 s in a 10% (w/w) solution of functional compound 11 in FIG. 1 in methyl ethyl ketone (MEK). The lens is removed and re-equilibrated in deionized water. Subsequently the lens is placed on a female mold surface. Using a Hamamatsu high pressure mercury lamp system the lens is exposed to light in the amount of 10 mW/cm$^2$ (ESE UVB sensor with 297 nm long pass filter in place and ~16% lamp intensity) for 60 seconds. The lens undergoes a 20 hour extraction step in MEK and the UV/VIS transmission is measured. A control contact lens of example 2 is dipped for 60 s in a 10% (w/w) solution of functional compound 11 in FIG. 1 in methyl ethyl ketone (MEK). The lens is removed, re-equilibrated in deionized water, extracted for 20 hours in MEK and the UV/VIS transmission is measured. The lens is not subsequently exposed to UV light as is done with the previous lens.

The lens exposed to UV light shows a 21.1% UVA and 2.3% UVB and 96.0% luminous transmittance versus 81.1% UVA and 65.2% UVB and 98.5% luminous transmittance compared to the not UV light exposed control lens.

Example 5

A contact lens of example 2 is dipped for 120 s in a 20% (w/w) solution of functional compound 13 in FIG. 1 in methyl ethyl ketone (MEK). The lens is removed and re-equilibrated in deionized water. Subsequently the lens is placed on a female mold surface. Using a Hamamatsu high pressure mercury lamp system the lens is exposed to light in the amount of 10 mW/cm$^2$ (ESE UVB sensor with 297 nm long pass filter in place and ~16% lamp intensity) for 120 seconds. The lens undergoes a 20 hour extraction step in MEK and the UV/VIS transmission is measured. A control contact lens of example 2 is dipped for 120 s in a 20% (w/w) solution of functional compound 13 in FIG. 1 in methyl ethyl ketone (MEK). The lens is removed, re-equilibrated in deionized water, extracted for 20 hours in MEK and the UV/VIS transmission is measured. The lens is not subsequently exposed to UV light as is done with the previous lens.

The lens exposed to UV light shows a 36.7% UVA and 0.3% UVB and 94.1% luminous transmittance versus 92.0% UVA and 56.6% UVB and 97.7% luminous transmittance compared to the not UV light exposed control lens.

Example 6

A contact lens of example 2 is dipped for 60 s in a 20% (w/w) solution of functional compound 13 in FIG. 1 in methyl ethyl ketone (MEK). The lens is removed and re-equilibrated in deionized water. Subsequently the lens is placed on a female mold surface. Using a Hamamatsu high pressure mercury lamp system the lens is exposed to light in the amount of 10 mW/cm$^2$ (ESE UVB sensor with 297 nm long pass filter in place and ~16% lamp intensity) for 60 seconds. The lens undergoes a 20 hour extraction step in MEK and the UV/VIS transmission is measured. A control contact lens of example 2 is dipped for 60 s in a 20% (w/w) solution of functional compound 13 in FIG. 1 in methyl ethyl ketone (MEK). The lens is removed, re-equilibrated in deionized water, extracted for 20 hours in MEK and the UV/VIS transmission is measured. The lens is not subsequently exposed to UV light as is done with the previous lens.

The lens exposed to UV light shows a 33.6% UVA and 0.1% UVB and 97.1% luminous transmittance versus 92.7% UVA and 59.4% UVB and 97.3% luminous transmittance compared to the not UV light exposed control lens.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A method for making an ophthalmic lens comprising:
   contacting the lens with a solution comprising a functional compound in an alcohol, a ketone, an ether, an aldehyde, or any combination thereof, wherein the functional compound comprises at least one group capable of forming a covalent bond with the lens upon exposing the lens to irradiation and/or heat, wherein the lens comprises a silicon hydrogel; and
   irradiating and/or heating the lens produced in step (a) to covalently attach the functional compound to the lens, wherein the lens subjected to step a) and step b) treatment has an UVB absorbing capability characterized by having an UVB transmittance being at least 50 percentage lower than that of the lens subjected to only step a)

treatment when both lenses are extracted with methyl ethyl ketone for about 20 hours.

2. The method of claim 1, wherein the lens is produced by curing one or more lens-forming materials, wherein the lens-forming material comprises an actinically crosslinkable prepolymer, a thermally-crosslinkable prepolymer, a hydrophilic vinylic monomer, a silicone-containing prepolymer, a silicon-containing vinylic monomer or macromer, a siloxane-containing macromer, or any combination thereof.

3. The method of claim 1, wherein the functional compound comprises a UV absorbing group, a hydrophilic group, an antimicrobial polymer, a mucin adsorbing group, or any combination thereof.

4. The method of claim 1, wherein the at least one group capable of forming a covalent bond with the lens comprises a photoinitiator, a thermal initiator, an olefinic group, or any combination thereof.

5. The method of claim 4, wherein the photoinitiator comprises a phosphine oxide, a peroxide group, an azide group, an α-hydroxyketone, or an α-aminoketone.

6. The method of claim 4, wherein the olefinic group comprises an acrylate group, a methacrylate group, an acrylamide group, a methacrylamide group, an allyl group, a vinyl group, a vinylester group, or a styrenyl group.

7. The method of claim 1, wherein the functional compound comprises an ultraviolet absorber, a photoinitiator directly or indirectly bonded to the ultraviolet absorber, and an olefinic group directly or indirectly bonded to the ultraviolet absorber.

8. The method of claim 1, wherein the functional compound comprises the formula I

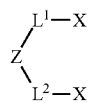

I wherein X comprises a photoinitiator;
Y comprises an olefinic group;
Z comprises an ultraviolet absorber; and
$L^1$ and $L^2$ comprise, independently, an optional linker.

9. The method of claim 8, wherein the ultraviolet absorber comprises a benzotriazole or a benzophenone.

10. The method of claim 8, wherein the photoinitiator comprises a phosphine oxide, a peroxide group, or an azide group.

11. The method of claim 8, wherein the photoinitiator comprises an -hydroxyketone or an -aminoketone.

12. The method of claim 1, wherein the functional compound comprises the formula V

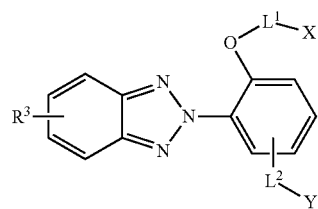

V wherein $R^3$ comprises hydrogen, an alkyl group, a halogen, an aryl group, an aralkyl group, or an alkoxy group;
$L^1$ and $L^2$ comprise, independently, a linker;
X comprises a photoinitiator; and
Y comprises an olefinic group.

13. The method of claim 1, wherein the functional compound comprises a hydrophilic polymer bonded to a photoinitiator via a linker.

14. The method of claim 1, wherein the functional compound comprises an ultraviolet absorber, a photoinitiator, and a mucin adsorbing unit, wherein the photoinitiator and mucin adsorbing unit are covalently bonded to the ultraviolet absorber.

15. An ophthalmic lens produced by the method of claim 1.

* * * * *